United States Patent
Schmid et al.

(10) Patent No.: US 9,062,671 B2
(45) Date of Patent: Jun. 23, 2015

(54) METHOD AND DEVICE FOR CONTROLLING A VACUUM APPARATUS

(71) Applicant: Ford Global Technologies, LLC, Dearborn, MI (US)

(72) Inventors: Reiner Schmid, Bergisch Gladbach (DE); Martin Tarnowski, Solingen (DE); Ian Moore, Pulheim (DE); Russell William Ferguson, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/200,596

(22) Filed: Mar. 7, 2014

(65) Prior Publication Data

US 2014/0186192 A1    Jul. 3, 2014

Related U.S. Application Data

(63) Continuation of application No. 13/215,704, filed on Aug. 23, 2011, now Pat. No. 8,678,773.

(30) Foreign Application Priority Data

Aug. 24, 2010   (DE) .................... 10 2010 037 129

(51) Int. Cl.
    F04B 49/06   (2006.01)
    F04B 49/08   (2006.01)
    B60T 17/02   (2006.01)
    F04B 37/14   (2006.01)

(52) U.S. Cl.
    CPC .................. *F04B 49/06* (2013.01); *B60T 17/02* (2013.01); *F04B 37/14* (2013.01); *F04B 49/065* (2013.01); *F04B 2205/03* (2013.01); *F04B 2205/063* (2013.01); *F04B 2207/02* (2013.01)

(58) Field of Classification Search
    CPC ........... F04B 2205/063; F04B 2207/02; F04B 49/065; F04B 49/06; F04B 37/14; F04B 2205/03; B60T 17/02
    USPC .................... 417/14, 18, 44.2, 53, 63; 701/36
    See application file for complete search history.

(56) References Cited

U.S. PATENT DOCUMENTS

| 6,171,072 B1 * | 1/2001 | West et al. .................... 417/298 |
| 6,955,406 B2 * | 10/2005 | Blue ................................. 303/7 |
| 2012/0051942 A1 | 3/2012 | Schmid et al. |

FOREIGN PATENT DOCUMENTS

| EP | 1311418 | 10/2004 |
| JP | 9058457 | 3/1997 |

* cited by examiner

*Primary Examiner* — Bryan Lettman
(74) *Attorney, Agent, or Firm* — Raymond L. Coppiellie; Brooks Kushman P.C.

(57) ABSTRACT

Method and device for controlling a vacuum apparatus. A method for controlling a vacuum apparatus that applies vacuum to a vacuum accumulator with a pump of a pneumatically operated servo unit of a motor vehicle. The method comprises the steps of determining the pressure in the vacuum accumulator; determining the ambient pressure; adapting a pump control signal to the ambient pressure; comparing the pressure in the vacuum accumulator with an adapted pump control signal; and outputting a pump actuation signal that is a function of the comparison.

8 Claims, 3 Drawing Sheets

METHOD AND DEVICE FOR CONTROLLING A VACUUM APPARATUS

CROSS-REFERENCE TO RELATED APPLICATIONS

This application is a continuation of U.S. application Ser. No. 13/215,704 filed Aug. 23, 2011, now U.S. Pat. No. 8,678,773, which, in turn, claims the benefits under 35 U.S.C. §119(a)-(d) to DE 10 2010 037 129.7 filed Aug. 24, 2010, which are hereby incorporated by reference in their entirety.

TECHNICAL FIELD

The invention relates to a method for controlling a vacuum apparatus of a pneumatically operated servo unit of a motor vehicle that applies vacuum to a vacuum accumulator with a pump.

BACKGROUND

A vacuum pump (ON/OFF-Mode) is controlled by means of switches that change its switching point with the changing ambient pressure, for example as a result of the altitude above sea level changing. As a result, as the altitude increases the absolute OFF switching pressure which is controlled by the switch decreases, and consequently from a certain altitude it is no longer possible for the vacuum pump to go below the predefined absolute pressure in order to switch off the pump. This means that starting from this time the pump can no longer switch off. The critical operating altitude for this fault event is the lowest the absolute pressure which is defined for switching off the pump. If the pump reaches a minimum absolute pressure of 14% of the ambient pressure and if the absolute pressure for switching off the pump is 233 mbar at sea level, the pump can no longer switch off starting from an altitude of approximately 1000 m. This leads to unnecessarily long pump running times and service life problems.

Possible pump damage can be avoided by limiting the running time of the pump in combination with an ON/OFF hysteresis avoidance algorithm. However, this compromise increases pump running time.

Pumps may be actuated by fixed switching thresholds, wherein the control pressures do not change with the altitude. Fixed values relating to the altitude for the switching on and switching off signals are possible only with sensors. Fixed pump switching thresholds result in a significant reduction in the differential pressure as the operating altitude increases. As a result, the available deceleration potential decreases at the modulation point of the vacuum brake booster. Starting at a critical operating altitude, the switching on threshold decreases to zero bar, and the pump can no longer be switched on that leads to a failure of the vacuum supply.

EP 1 311 418 B1 describes a method for monitoring a vacuum apparatus which detects defects in the suction pump or leakages in the system. An initial pressure is measured, and after a time interval a final pressure in the vacuum accumulator is measured, and the difference between the pressures is compared with a limiting value that can also be determined as a function of the ambient pressure. A signal is generated when the limiting value is undershot.

One exemplary object of the invention is to improve the control of a vacuum apparatus. Additional advantages of the invention are defined in the dependent claims.

According to a first aspect of the invention, a method for controlling a vacuum apparatus of a pneumatically operated servo unit of a motor vehicle, in which vacuum is applied to a vacuum accumulator via a pump, has the following steps:
- determining the pressure in the vacuum accumulator;
- determining the ambient pressure;
- adapting pump control signals to the ambient pressure;
- comparing the pressure in the vacuum accumulator with the adapted pump control signals;
- outputting a pump actuation signal as a function of the comparison.

The steps do not necessarily have to be carried out in the specified order. Therefore, for example, the ambient pressure can be determined first.

The ambient pressure to be determined may be already available in an engine controller. The value for the ambient pressure for controlling the vacuum apparatus can be transmitted, for example, via a vehicle-mounted CAN bus.

SUMMARY

According to the disclosed method, a pump actuation signal is provided that is adapted to the operating altitude and prevents undesired over-running of the pump. Both the required switching off threshold and the switching on threshold can be reached by the pump at all altitudes. This method of actuation permits pump running time to be minimized. As a result, unnecessarily long running times of the pump are avoided that minimize failures and repairs. This control concept allows for optimizing between a sufficient vacuum and a minimized pump running time to function robustly at all altitudes.

The pump control signals can be switching on and switching off signals that are the most important and are critical for safety.

Differential pressure signals of the pump control signals form a constant ratio with the ambient pressure with respect to the operating altitude. Switching on limiting values and switching off limiting values are optimized for every operating altitude.

The pressure in the vacuum accumulator can be measured in relative terms. The switching on or switching off pump control signals can then be formed by means of the product of a constant ratio of a differential pressure threshold of the switching on of the pump or switching off of the pump with respect to the adapted pump control signals and the ambient pressure. This formula permits the instantaneous ambient pressure for a relative measured value for the pressure in the vacuum accumulator to be taken into account easily.

The pressure in the vacuum accumulator can be measured in absolute terms. The pump control signal for switching on or switching off can then be formed by means of the product of the ambient pressure and the ratio of one minus a constant ratio of a differential pressure threshold of the switching on of the pump or switching off of the pump with respect to the ambient pressure. This formula permits the instantaneous ambient pressure for an absolute measured value for the pressure in the vacuum accumulator to be taken into account easily.

According to a further aspect of the disclosure, a computer program performs the method described above on a computer. This computer can be a control computer or some other computer or controller of the motor vehicle.

The computer program can be stored in a memory, in particular in a nonvolatile memory. This permits rapid and repeated use of the program, for example after each new start of the motor vehicle.

According to a further aspect of the disclosure, a device for controlling a vacuum apparatus of a pneumatically operated servo unit of a motor vehicle is provided, wherein the vacuum apparatus has a vacuum accumulator which is fluidically connected to a pump and to which vacuum can be applied. The device has a controller with signal inputs for the pressure in the vacuum accumulator and for the ambient pressure and a signal output for outputting pump actuation signals. The controller adapts the pump control signals to the ambient pressure and compares the pressure in the vacuum accumulator with the adapted pump control signals and outputs a pump actuation signal.

The device according to the disclosure supplies a pump actuation signal which is adapted to the operating altitude and prevents improper over-running of the pump. Both the required switching off threshold and the switching on threshold can be reached by the pump at all altitudes. This method of actuation may minimize pump running time. As a result, unnecessarily long running times of the pump are avoided that minimizes failures and repairs. This control concept allows for optimizing between a sufficient vacuum and a minimized pump running time to function robustly at all altitudes. The device is of simple and robust design.

The signal input for the pressure in the vacuum accumulator can be designed for an analog signal. This signal input permits a high degree of flexibility since analog and/or digital signals can be received and processed.

The controller can process a relative signal or an absolute signal for the pressure in the vacuum accumulator. This permits relative and absolute sensors to be used, which permits the device to be used widely.

BRIEF DESCRIPTION OF THE DRAWINGS

The invention will be described in more detail below with reference to the drawings, in which.

DETAILED DESCRIPTION

Detailed embodiments of the disclosure that are disclosed are examples that may be embodied in various and alternative forms. The figures are not necessarily to scale and some features may be exaggerated or minimized to show details of particular components. Specific structural and functional details are not to be interpreted as limiting, but merely as a representative basis for teaching one skilled in the art how to practice the present invention.

Figure 1:
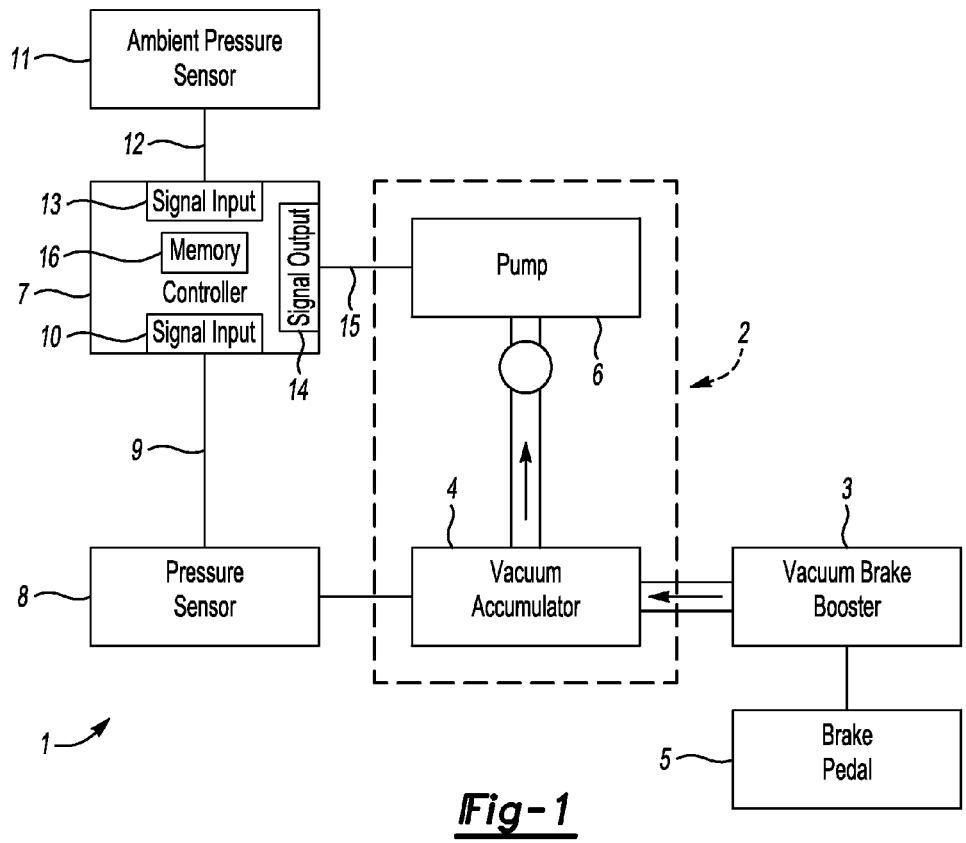
FIG. 1 is a block diagram of a device for controlling a vacuum apparatus.

FIG. 1 illustrates a device for controlling 1 a vacuum apparatus 2 of a pneumatically operated servo unit, for example, a vacuum brake booster 3 of a motor vehicle. The vacuum apparatus 2 has a vacuum accumulator 4, which is fluidically connected to the brake booster 3 which is activated by a brake pedal 5. The vacuum accumulator 4 is also fluidically connected to an intake manifold (not illustrated) of an engine of the motor vehicle. A branch line branches off from this connecting line to a pump 6, for example an electric suction pump. A check valve is typically arranged in the connecting line and permits the flow only from the vacuum accumulator 4 to the intake line. The pump 6 can apply vacuum to the vacuum accumulator 4.

The air flows and their directions are represented by arrows in the fluid lines. The vacuum apparatus 2 comprises the vacuum accumulator 4, the pump 6 and the fluid lines.

A controller 7, such as, for example, a computer, a microcontroller or some other computer, is connected to a pressure sensor 8 via a signal line 9. The pressure sensor 8 measures the pressure in the vacuum accumulator 4. The signal of the pressure sensor 8 is received by the controller 7 via a signal input 10. An ambient pressure sensor 11 is connected to the controller 7 via a further signal line 12 and a further signal input 13. The ambient pressure sensor 11 can also be integrated into the pressure sensor 8; in this case, the pressure sensor 8 supplies both measured values via the signal line 9. The signal lines which are shown can be individual lines, a bus system or part of a bus system. The ambient pressure can also be measured in a different system of the motor vehicle and then the measured value for the ambient pressure of the controller 7 can be made available via a signal line without the controller 7 being directly connected to the ambient pressure sensor 11.

The controller 7 has a signal output 14 to which the pump 6 is connected via a control line 15. The control line 15 can also contain electronic components, for example a relay. The pump is controlled by the controller 7 on the basis of the received measured values.

The controller 7 comprises a nonvolatile memory 16, for example a ROM (Read-Only-Memory) or a flash memory, in which one or more programs are stored. The program (or programs) controls (or controls) the vacuum apparatus 2.

Figure 2:
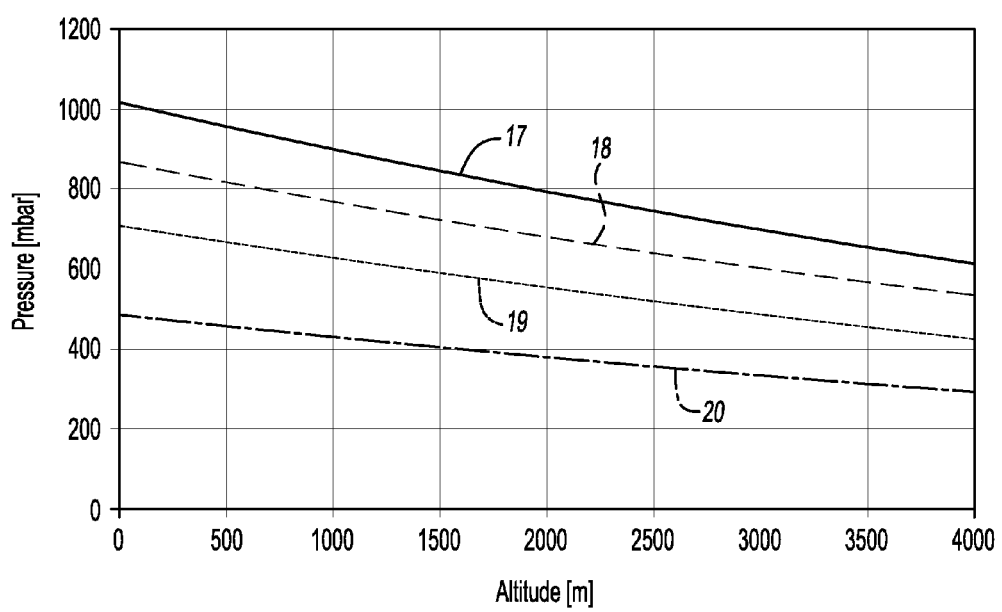
FIG. 2 is a diagram of the pump switching thresholds.

FIG. 2 shows the actuation of the pump with ON/OFF switching thresholds of the pump, which are adapted to the operating altitude. The altitude above sea level is given in meters on the x axis, while the pressure is plotted in millibars on the y axis.

The curve 17 shows the profile of the ambient pressure which decreases as the altitude increases. The maximum possible increase in differential pressure of the pump plotted against the altitude is shown by means of the curve 18. The curve 19 shows the differential pressure for the pump switching on threshold, or ON switching threshold of the pump, and curve 20 represents the differential pressure for the pump switching off threshold, or OFF switching threshold, of the pump.

The adaptation of the ON/OFF switching thresholds of the pump to the operating altitude results in a constant or approximately constant ratio of the differential pump ON/OFF switching pressure to the ambient pressure, which is shown in FIG. 2 through the approximate parallelism of the curves for the ON/OFF switching thresholds 19 and 20 with respect to the curve for the ambient pressure 17. The adaptation of the ON/OFF pump control signals to the operating altitude optimizes the running time of the pump and avoids actuation faults.

Figure 3:
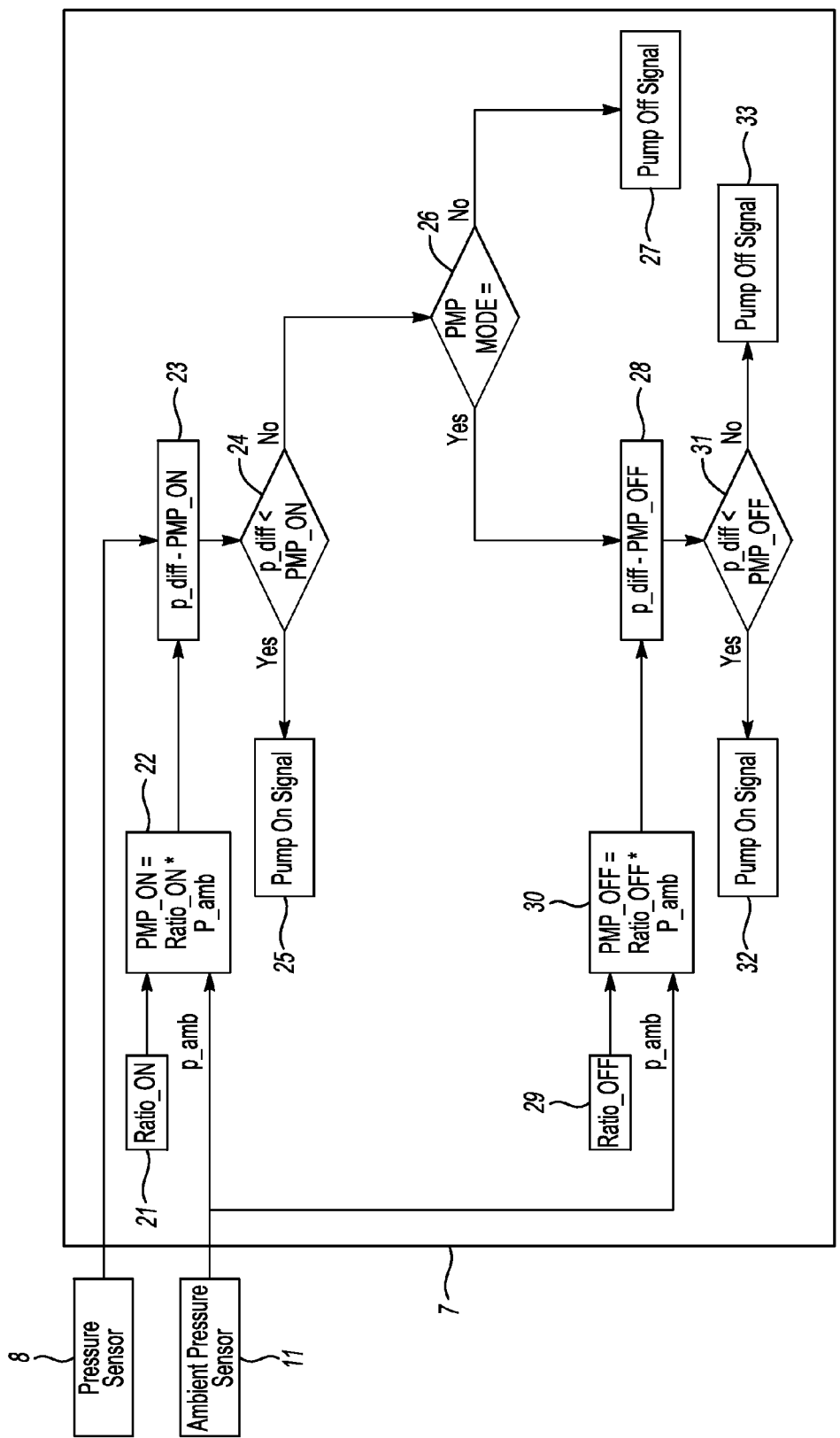
FIG. 3 is a flowchart of a device for controlling a vacuum apparatus for relative measurement of the pressure in the vacuum accumulator.

FIG. 3 shows a program for controlling the pump 6 (shown in FIG. 1) that is stored in the memory 16 (shown in FIG. 1) and run by the controller 7. The pressure sensor 8 supplies a relative pressure signal p_diff which can be amplified by an amplifier in the controller 7. The ambient pressure sensor 11, for example a component of an engine control module ECM, supplies a signal for the ambient pressure p_amb, for example via a CAN (Controller Area Network) bus.

A constant ratio of the differential pressure threshold PUMP ON to the ambient pressure is formed and is denoted as Ratio_ON (block 21). In block 22, the adaptation of the pump control signal PMP_ON for altitude as a differential pressure signal is performed according to the formula $$PMP\_ON = Ratio\_ON * p\_amb.$$

In blocks 23 and 24, the pump control signal PMP_ON is compared with the relative pressure signal p_diff. If p_diff is smaller than PMP_ON, a pump actuation signal PUMP ON is generated in block 25 and is output to the pump in order to start the pump. If p_diff is greater than PMP_ON in block 26 it is checked whether the pump state (PMP MODE) is active. If not, in block 27 the pump actuation signal PUMP OFF is generated and output to the pump. If the state is active, the system branches off to block 28, which is part of the routine for switching off the pump and whose function will be explained later.

In block 29, a constant ratio of the differential pressure threshold PUMP OFF with respect to the ambient pressure is formed and is denoted as Ratio_OFF. In block 30 the adaptation of the pump control signal PMP_OFF for altitude as a differential pressure signal is performed according to the formula $$PMP\_OFF = Ratio\_OFF * p\_amb.$$

In blocks 28 and 31, the pump control signal PMP_OFF is compared with the relative pressure signal p_diff. If p_diff is smaller than PMP_OFF in block 32 the pump actuation signal PUMP ON is generated and output to the pump in order to keep the latter actively in the mode. If p_diff is greater than PMP_OFF in block 33 the pump actuation signal PUMP OFF is generated and output to the pump in order to switch the latter off.

Figure 4:
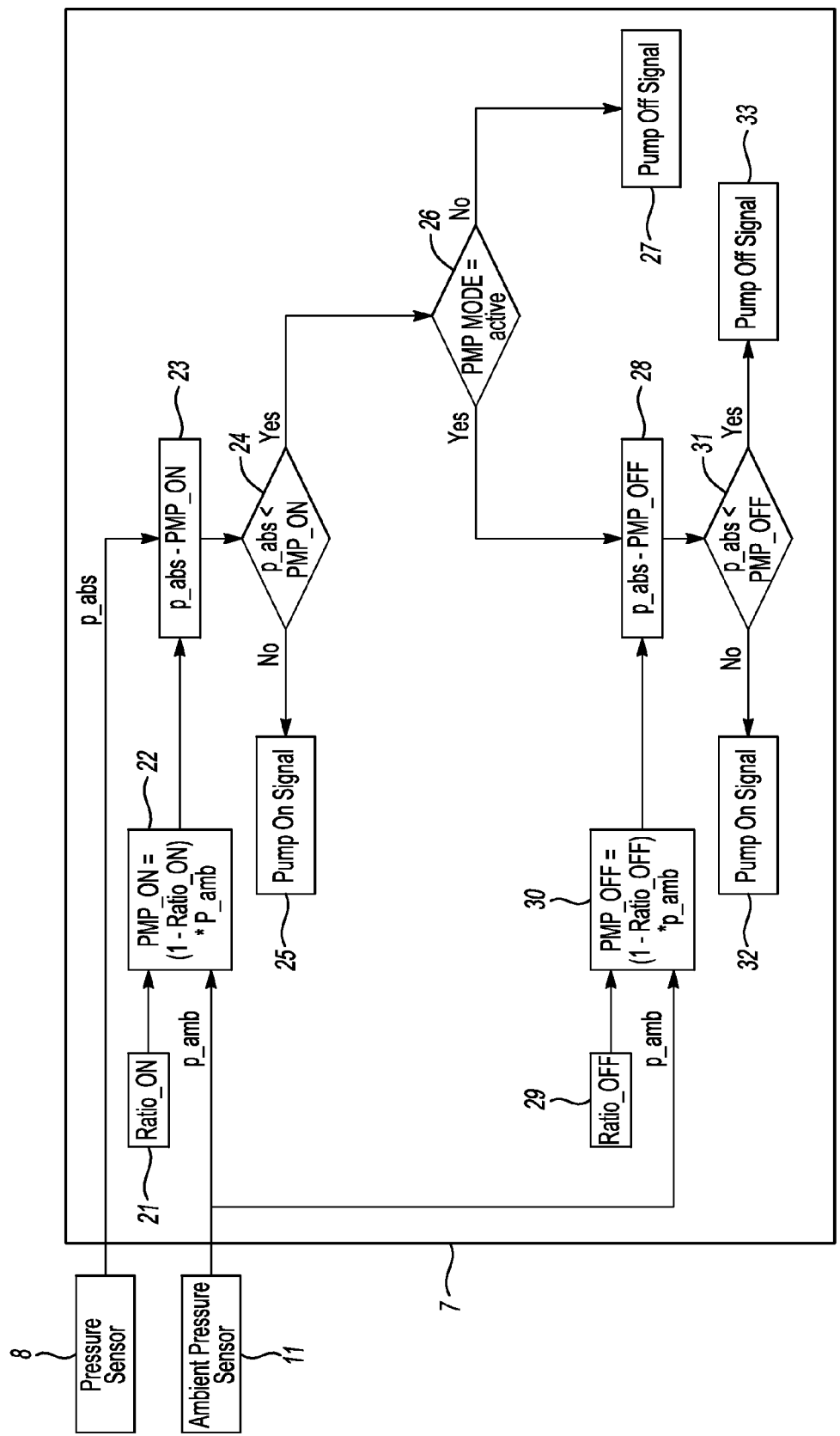
FIG. 4 is a flowchart of a device for controlling a vacuum apparatus for absolute measurement of the pressure in the vacuum accumulator.

FIG. 4 shows a further program for controlling the pump 6 (shown in FIG. 1), that is stored in the memory 16 (shown in FIG. 1) and is run by the controller 7. In FIG. 4 the same reference numerals are used as in FIG. 3 to identify similar process steps that refer in FIG. 4 to the absolute pressure values. In the embodiment of FIG. 4, in block 22, the pressure sensor 8 supplies an absolute pressure signal p_abs. In block 21, the adaptation of the pump control signal PMP_ON as an absolute pressure signal is performed. Here, the constant ratio for PUMP ON is subtracted from 1. The difference is subsequently multiplied by the ambient pressure. In block 23, in contrast to FIG. 3, the absolute pressure p_abs is fed in and used for the comparison of the pressure in the vacuum accumulator and the pump control signal PMP_ON. In block 24, the YES/NO signals are interchanged. The further comparison and the processing in blocks 23 to 27 is identical to the procedure in FIG. 3. Of course, the absolute pressure is also considered in these blocks.

In the switching off logic branch, in block 30 the adaptation of the pump control signal PMP_OFF for altitude is also performed as an absolute pressure signal, i.e. the difference between 1 and the constant ratio for PUMP OFF is formed here and is multiplied by the ambient pressure p_amb. In block 28 in contrast to FIG. 3, the absolute pressure p_abs is fed in and used for the comparison of the pressure in the vacuum accumulator and the pump control signal PMP_OFF. In block 31 the YES/NO signals are interchanged, i.e. the YES and NO signals are interchanged for the generation of the pump actuation signals PUMP ON and PUMP OFF.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for controlling a vacuum apparatus of a pneumatically operated servo unit of a motor vehicle, in which vacuum is applied to a vacuum accumulator via a pump, comprising the steps of:
   measuring a pressure in the vacuum accumulator in absolute terms;
   determining the ambient pressure;
   adapting pump control signals to the ambient pressure to develop an adapted pump control signal;
   comparing the pressure in the vacuum accumulator with the adapted pump control signals wherein the pump control signal is formed by means of a product of the ambient pressure and a ratio of one minus a constant ratio of a differential pressure threshold of the switching on or switching off of the pump with respect to the ambient pressure; and
   outputting a pump actuation signal as a function of the comparing the pressure.

2. The method for controlling the vacuum apparatus as claimed in claim 1, wherein the pump control signals are switching on and switching off signals.

3. The method for controlling the vacuum apparatus as claimed in claim 1, wherein a maximum and a minimum possible differential pressure of the pump forms a constant ratio with the ambient pressure with respect to the operating altitude.

4. The method for controlling the vacuum apparatus as claimed in claim 1, further comprising a computer program that carries out the method when it is run on a computer.

5. The method for controlling the vacuum apparatus as claimed in claim 4, wherein the computer program is stored in a nonvolatile memory.

6. A device for controlling a vacuum apparatus of a pneumatically operated servo unit of a motor vehicle, wherein the vacuum apparatus has a vacuum accumulator which is fluidically connected to a pump and to which vacuum is applied, having a controller with a first signal input that is an absolute signal for a pressure in the vacuum accumulator and a second signal input for an ambient pressure and a signal output for outputting a pump actuation signal, wherein the controller adapts the pump actuation signal as a product of a constant ratio of a differential pressure threshold of switching on or switching off the pump with respect to the adapted pump control signal and the second signal input.

7. The device for controlling the vacuum apparatus as claimed in claim 6, wherein the first signal input is designed for an analog signal.

8. The device for controlling the vacuum apparatus as claimed in claim 6, wherein the controller processes a relative signal for the first signal for the pressure in the vacuum accumulator.

* * * * *